United States Patent
Horii (10) Patent No.: US 11,586,792 B2
(45) Date of Patent: Feb. 21, 2023

(54) SCHEDULING FUSION FOR QUANTUM COMPUTING SIMULATION

(71) Applicant: International Business Machines Corporation, Armonk, NY (US)

(72) Inventor: Hiroshi Horii, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 547 days.

(21) Appl. No.: 16/211,435

(22) Filed: Dec. 6, 2018

(65) Prior Publication Data

US 2020/0184031 A1 Jun. 11, 2020

(51) Int. Cl.
*G06N 10/00* (2022.01)
*G06F 30/33* (2020.01)
*G06F 111/20* (2020.01)

(52) U.S. Cl.
CPC ............ *G06F 30/33* (2020.01); *G06N 10/00* (2019.01); *G06F 2111/20* (2020.01)

(58) Field of Classification Search
CPC ........ G06N 10/00; G06N 10/20; G06N 10/60; G06N 5/022; G06F 30/33; G06F 2111/20; G06F 30/3308
See application file for complete search history.

(56) References Cited

U.S. PATENT DOCUMENTS

2019/0332731 A1* 10/2019 Chen ..................... G06F 30/20
2021/0192114 A1* 6/2021 Boixo Castrillo .. G06F 30/3308

OTHER PUBLICATIONS

Boixo et al. "Simulation of low-depth quantum circuits as complex undirected graphical models," https://arxiv.org/abs/1712.05384, Jan. 2018 (Year: 2018).*
Haner et al., "0.5 Petabyte Simulation of a 45-Qubit Quantum Circuit," 2017, Proceedings of the International Conference for High Performance Computing, Networking, Storage and Analysis, ACM, 10 pages.
ProjectQ, "Features of ProjectQ," 3 pages. Retrieved on Dec. 3, 2018. https://projectq.ch/features/.
Ni et al., "Commuting quantum circuits: efficient classical simulations versus hardness results," Sep. 2018, 19 pages.

* cited by examiner

*Primary Examiner* — Matthew L Reames
(74) *Attorney, Agent, or Firm* — Amin, Turocy & Watson, LLP (57) ABSTRACT

Embodiments are provided to simulate a quantum circuit. A system receives a quantum circuit (or its representation), generates a graph, and adds edges for each n-qubit of fusion to be applied. Costs are estimated or calculated for various paths of gate fusion between endpoints in the graph. One or more paths are selected, for example, the lowest cost path based on a Dijkstra algorithm evaluation. A unitary matrix for each gate fusion is then generated for simulating the quantum circuit. A simulation is performed locally or remotely based on the gate fusions along the selected one or more paths, and thus, improving the memory and processor performance of the simulation.

25 Claims, 7 Drawing Sheets

SCHEDULING FUSION FOR QUANTUM COMPUTING SIMULATION

BACKGROUND

Simulation of quantum circuits and quantum computation is an important part of researching quantum computing algorithms, architectures, and devices. However, simulating quantum circuits of any significant breadth (i.e., qubit count) requires substantial memory and central processing unit (CPU) resources. For example, in a quantum computing simulation, all the quantum states must be loaded, updated, and stored for each gate being simulated. A state of n-qubits requires $2^n$ complex values. Simulation of a quantum computing device typically load, update, and store all the complex values using a unitary matrix for each gate operation. The calculations and operations to perform the computations on such a broad array of unitary matrices requires significant memory and processing resources. Accordingly, the memory requirements and the time required to simulate an elementary circuit operation, grow exponentially with the number of qubits. For example, the simulation of a 26-qubit quantum circuit, using double-precision arithmetic, requires 1 gigabyte (GB) of memory. Indeed, the memory requirements follow an exponential curve, doubling with each additional qubit. Significant CPU resources are also required to perform the required computations and to manipulate the large data structures involved in simulating a quantum circuit. Accordingly, simulation of quantum circuits and computations can be challenging to simulate due to the size of the quantum computing systems, even with the use of powerful computers or computing systems.

When simulating quantum circuits of many qubits, known quantum simulators enable gate fusion. Gate fusion is where a simulator will rewrite a quantum circuit by combining operations on adjacent qubits before applying them. For example, instead of applying a Hadamard gate to 5 qubits, the simulator calculates a product of the 1-qubit gate unitary matrices and then applies one 5-qubit gate, e.g., using a nested loop and cache blocking. By fusing these operations, the simulator avoids having to iterate through the state vector operations multiple times This increases the operational intensity of the simulation, especially when running on a classical computer.

Known simulators rely on a user to manually specify when a simulator can use gate fusion. This is because gate fusion can be harmful to the simulation depending on the system's processing resources and memory and the number of threads available on the processor running the simulation. In addition, it can be difficult to determine how many operations and qubits should be combined when gate fusion is enabled. For example, employing gate fusion can cause a simulator to spend significant time evaluating futile optimizations for the gate fusion. Accordingly, the known simulation systems remain inefficient, for example, regarding how to implement gate fusion, memory utilization (e.g., cache hits and misses) and execution time (e.g., the time needed to perform the simulated computation).

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatuses, and/or computer program products that facilitate scheduling fusion for quantum computing simulation.

According to an embodiment, a system, comprises a memory that stores computer executable components and a processor that executes the computer executable components stored in the memory. The computer executable components comprise a development component that receives data for a quantum circuit comprising a plurality of quantum gates operating on one or more qubits, generates a graph that represents the quantum circuit, wherein the graph comprises nodes representative of the plurality of quantum gates and edges added between the nodes to indicate where gate fusions can be applied among the plurality of quantum gates, and select one or more paths through at least a portion of the graph based on respective costs for where the gate fusions can be applied. The executable components also comprise a simulator that simulates the quantum circuit based on the one or more paths selected by the development component. An advantage of this approach is that it improves determining where to apply gate fusion and how much gate fusion can be used. With improved gate fusion, more operations for a simulation can be merged into fewer operations, thus increasing operational intensity, memory usage, and processor utilization of the simulation.

According to a further embodiment, the compiler determines the costs of the edges for when fusion can be applied in a variety of ways, for example, based on a test run, a table lookup (e.g., from a table stored in a memory), or an estimate based on the number of qubits on which the quantum gates being fused are operating on. An advantage of this is that it enables the gate fusion and simulation to be optimized according to a variety of factors.

According to a further embodiment, the compiler determines a lowest cost path, for example, based on a Dijkstra algorithm. An advantage of this approach is that it allows for optimization of gate fusion on larger qubit quantum circuits and automation of determining which gate fusions can be applied.

According to another embodiment, a system, comprises a memory that stores computer executable components and a processor that executes the computer executable components stored in the memory. The computer executable components comprise an interface component that receives a simulation request comprising a representation of a quantum circuit. The quantum circuit comprises a plurality of quantum gates operating on one or more qubits. The interface component generates a graph representative of the quantum circuit. The graph comprises nodes that represent the plurality of quantum gates and edges added between the nodes to indicate where gate fusions can be applied among the plurality of quantum gates. A simulation component selects one or more paths through at least a portion of the graph based on respective costs for where the gate fusions can be applied in the quantum circuit, simulates the quantum circuit based on the simulation request and the selected one or more paths, and transmits a result. An advantage of this approach is that it improves determining where to apply gate fusion and how much gate fusion can be used. With improved gate fusion, more operations for a simulation can be merged into fewer operations, thus increasing operational intensity, memory usage, and processor utilization of the simulation. Another advantage is that the system can utilize a remote computing resource to optimize and perform the simulation, for example, for a simulation for large qubit quantum circuit.

In addition, this enables the system to cooperate with multiple simulators and/or hardware resources over a network.

According to a further embodiment, the simulation component also determines a lowest cost path, for example, based on a Dijkstra algorithm. An advantage of this approach is that it allows for optimization of gate fusion on larger qubit quantum circuits and automation of determining which gate fusions can be applied.

According to another embodiment, a computer-implemented method comprises receiving data for a quantum circuit comprising a plurality of quantum gates operating on one or more qubits, generating a graph that represents the quantum circuit, wherein the graph comprises nodes representative of the plurality of quantum gates and edges added between the nodes to indicate where gate fusions can be applied among the plurality of quantum gates. The edges are assigned respective costs for when the gate fusions are applied. The method also comprises simulating the quantum circuit based on one or more selected paths through at least a portion of the graph and the respective costs along the one or more selected paths. An advantage of this approach is that it improves determining where to apply gate fusion and how much gate fusion can be used. With improved gate fusion, more operations for a simulation can be merged into fewer operations, thus increasing operational intensity, memory usage, and processor utilization of the simulation.

According to a further embodiment, the computer-implemented method also comprises determining the costs of the edges for when fusion can be applied based on a variety of ways, for example, based on a test run, a table lookup (e.g., from a table stored in a memory), or an estimate based on the number of qubits on which the quantum gates being fused are operating on. An advantage of this is that it enables the method to optimize gate fusion and simulation according to a variety of factors.

According to a further embodiment, the computer-implemented method also comprises determining a lowest cost path, for example, based on a Dijkstra algorithm. An advantage of this approach is that it allows for optimization of gate fusion on larger qubit quantum circuits and automation of determining which gate fusions can be applied.

According to another embodiment, a computer program product that facilitates quantum computing simulation of quantum circuit is provided. The computer program product comprises a computer readable storage medium having program instructions embodied therewith. The program instructions are executable by a processor to cause the processor to receive data for a quantum circuit comprising a plurality of quantum gates operating on one or more qubits, and generate a graph that represents the quantum circuit, wherein the graph comprises nodes representative of the plurality of quantum gates and edges added between the nodes to indicate where gate fusions can be applied among the plurality of quantum gates. The edges are assigned respective costs for when the gate fusions are applied. The program instructions also cause the processor to simulate the quantum circuit based on one or more selected paths and the respective costs along the one or more selected paths. An advantage of this approach is that it improves determining where to apply gate fusion and how much gate fusion can be used. With improved gate fusion, more operations for a simulation can be merged into fewer operations, thus increasing operational intensity, memory usage, and processor utilization of the simulation.

According to a further embodiment, the computer program product also comprises program instructions to cause a processor to determine the costs of the edges for when fusion can be applied based on a number of ways, for example, based on a test run, a table lookup (e.g., from a table stored in a memory), or an estimate based on the number of qubits on which the quantum gates being fused are operating on. An advantage of this is that it enables the method to optimize gate fusion and simulation according to a variety of factors.

According to a further embodiment, the computer program product also comprises program instructions to cause a processor to determine a lowest cost path, for example, based on a Dijkstra algorithm. An advantage of this approach is that it allows for optimization of gate fusion on larger qubit quantum circuits and automation of determining which gate fusions can be applied.

According to another embodiment, a computer program product facilitates quantum computing simulation of quantum circuit. The computer program product comprises a computer readable storage medium having program instructions embodied therewith. The program instructions are executable by a processor to cause the processor to generate, by the processor, a graph that represents a quantum circuit comprising a plurality of quantum gates operating on one or more qubits. The graph comprises nodes representative of the plurality of quantum gates and edges added between the nodes to indicate where gate fusions can be applied among the plurality of quantum gates. The edges are assigned respective costs for where the gate fusions can be applied. The program instructions can further cause a processor to simulate, by the processor, the quantum circuit based on one or more selected paths and the respective costs along the one or more selected paths. An advantage of this approach is that it provides program instructions that improve determining where to apply gate fusion and how much gate fusion can be used. With improved gate fusion, more operations for a simulation can be merged into fewer operations by a processor executing the program instructions, thus increasing operational intensity, memory usage, and processor utilization of the simulation.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

To facilitate the use and research of quantum systems, one or more embodiments for simulating quantum circuits are described herein. In one embodiment, software can be installed on a computing device that allows a user to run quantum circuit-based experimental programs on a quantum circuit simulator running locally or one or more simulators that can be accessed remotely over a network. One or more embodiments allow the user to create and input quantum circuits in textual form, such as via text editor, in graphical form, etc. A quantum circuit representation, such as an Open Quantum Assembly Language (QASM or OpenQASM) file, is then generated by the software. As will be described further herein, the quantum circuit representation is optimized to minimize the computing resources needed to simulate the quantum circuit. Simulations of the quantum circuit are requested (locally or from a remote system) and results are output to the user. The results can be in any graphical textual form that facilitates analysis by a user or another computing device.

A problem of the art is that gate fusion for a quantum circuit, especially for a large qubit circuit can be inefficient, depending on the resources or the simulator. In addition, it can be a complex task to analyze a quantum circuit and determine where and when to apply gate fusion and predict the effect on the simulation performance. In one or more embodiments, generating a graph that comprises nodes representative of the plurality of quantum gates and edges added between the nodes to indicate where gate fusions can be applied among the plurality of quantum gates provides a solution. Although gate fusion for quantum simulation are known, the embodiments are the first to recognize a systematic approach to analyze multiple scenarios for when and where to apply gate fusion.

In further embodiments, the costs of the edges are determined based on a number of ways, for example, based on a test run, a table lookup (e.g., from a table stored in a memory), or an estimate based on the number of qubits on which the quantum gates being fused are operating on. An advantage of this is that it provides a solution to optimize gate fusion and simulate a quantum circuit according to a variety of factors.

In addition, in yet further embodiments, a lowest cost path provided by gate fusion through at least a portion of the graph is determined, for example, based on a Dijkstra algorithm. An advantage of this approach is that it provides a solution for optimization of gate fusion on larger qubit quantum circuits and automation of determining which gate fusions can be applied.

Accordingly, the embodiments mitigate the relatively high computational demands placed upon a system running such a simulation by employing gate fusion. For example, in one embodiment, to simulate a quantum circuit, a simulator receives a quantum circuit (or its representation), generates a graph, and adds edges for each n-qubit of fusion to be applied. The simulator estimates costs for various paths of gate fusion between endpoints in the graph, selects one or more paths (for example, the lowest cost path based on a Dijkstra algorithm evaluation), and generates a unitary matrix for each gate fusion. The simulator can then simulate (or request a simulation) based on the selected path and using the unitary matrices for each gate fusion. An advantage of this approach used in one or more of the embodiments is that various gate fusion scenarios can be evaluated. Thus, a simulation can use less memory and processing resources.

Figure 1:
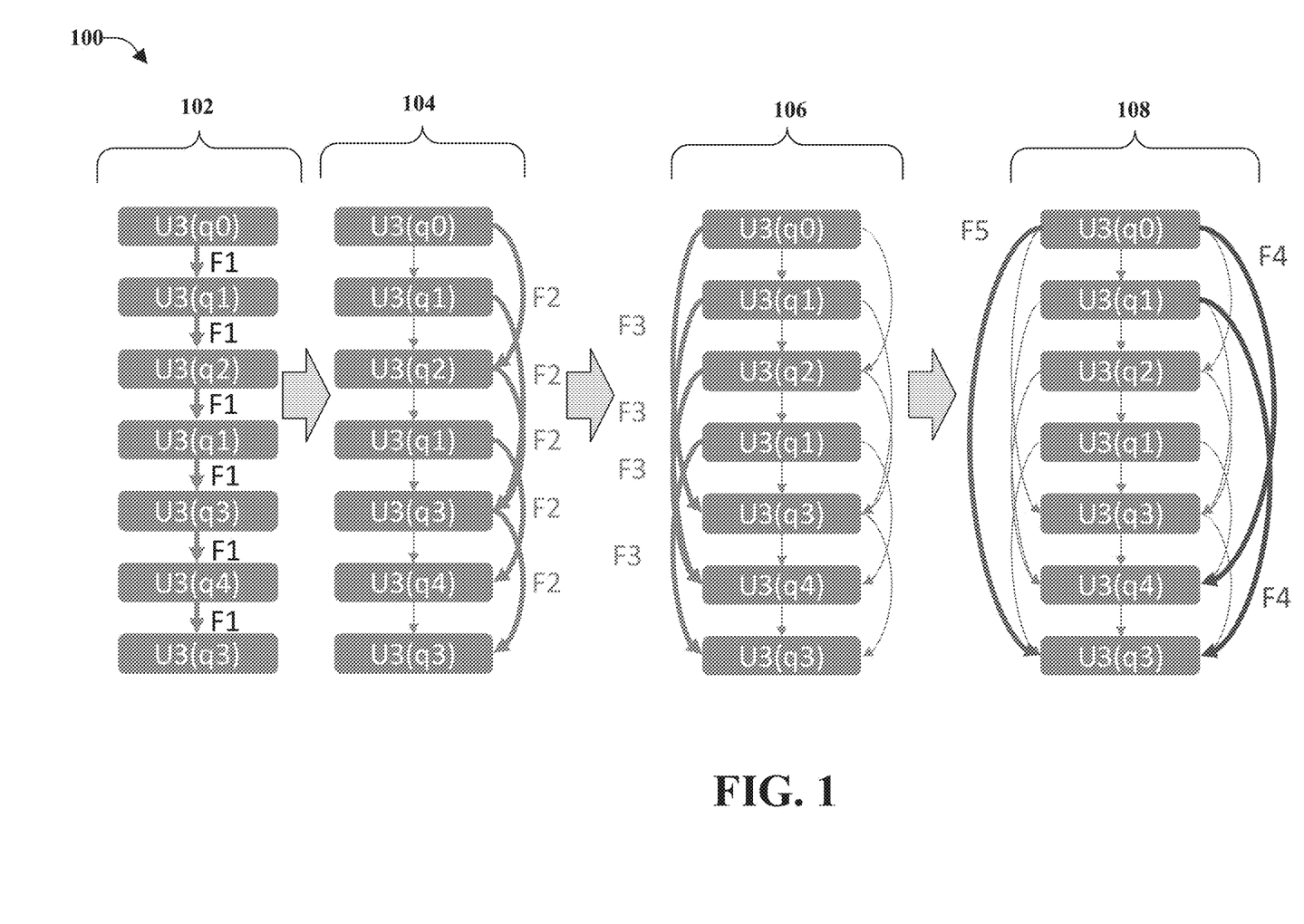
FIG. 1 illustrates a non-limiting, example embodiment of schematic representation illustrating a graph of operations for simulating quantum circuit based on gate fusion in accordance with one or more embodiments herein.

FIG. 1 illustrates a non-limiting, example embodiment of schematic representation illustrating a graph of operations for simulating quantum circuit based on gate fusion in accordance with one or more embodiments herein. As shown, a graph 100 illustrates a flow of operations through a quantum circuit (not shown). In one or more embodiments, the graph 100 is analyzed for various possible gate fusion scenarios.

For example, each n-qubit fusion, edges are added to the graph 100 from a gate fusion to a next gate in the quantum circuit. As shown in FIG. 1, at 102, edges for fusions F1 are added for each 1-qubit fusion between qubits. At 104, edges for fusions F2 are added for each 2-qubit fusion between qubits. At 106, edges fusions F3, are added for each 3-qubit fusion between qubits. At 108, edges for fusions F4 and F5 are added for each 4-qubit and 5-qubit fusion. One skilled in the art will recognize that the embodiments can accommodate any number of qubits and extent of fusion.

In addition, in some embodiments, costs can be assigned or estimated for each of edges for fusions F1, F2, F3, and so forth. Costs can be based on a variety of criteria, such as number of instructions, memory size, etc. In some embodiments, costs can be estimated based on test runs, number of instructions, a pre-computed table (e.g., stored in memory or storage), etc. In one embodiment, costs can be assigned to each edge to represent (or estimate) an elapsed time to execute simulation of a gate or a gate fusion.

Figure 2:
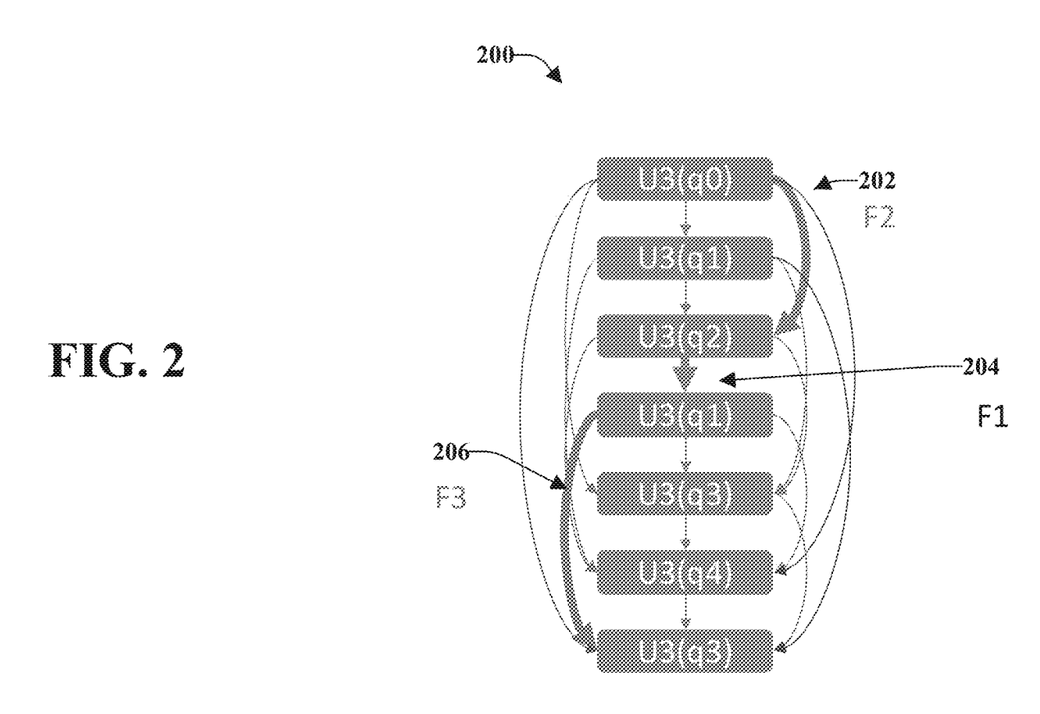
FIG. 2 illustrates a non-limiting example embodiment of a selected path between endpoints in the graph shown in FIG. 1 in accordance with one or more embodiments herein.

FIG. 2 illustrates a non-limiting example embodiment of a selected path between endpoints in the graph 100 shown in FIG. 1 in accordance with one or more embodiments herein. As shown, a path 200 of gate fusions is illustrated. A path 200 can span between quantum gates (not shown in FIG. 2) in a quantum circuit (not shown in FIG. 2).

The path 200 can be selected in various ways. For example, as noted above, edges in the graph (such as F1, F2, and F3) can be assigned costs based on the number of instructions used to perform the fusion, a test run, or an estimate based on the number of qubits, the type of gate, an elapsed time to execute a gate, etc. In one embodiment, edges in the graph are assigned costs to represent the elapsed time to execute a gate. The elapsed time can be based, for example, based on a test run that simulates a gate. As alternative, the elapsed time can be based on an estimate of the elapsed time to execute a gate. The estimate for the elapsed time can be based on the number of qubits being operated on by the gate, the type of gate, etc.

The path 200 can be selected based on costs of the edges. In one or more embodiments, the path 200 can be selected using a dynamic programming algorithm that selects the path 200 based on recursively breaking the path 200 into portions, finding an optimal solution for each portion, and then combining these solutions. In one embodiment, the path 200 can be selected using a Dijkstra algorithm to find a lowest cost path, for example, where cost of a path is the elapsed time to execute the gates along the path 200. Other algorithms, such as a Bellman-Ford, or Johnson algorithm, can be used to determine and select a path (such as path 200) through graph 100. For example, as shown in FIG. 2, the path 200 can comprise F2 edge 202 for a 2-qubit gate fusion for qubits {q0, q1}, F1 edge 204 for a 1-qubit gate fusion for qubit {q2}, and F3 edge 206 for a 3-qubit fusion of qubits {q1, q3, q4}. One skilled the art will recognize that any path through graph 100 for a quantum circuit can be used in a simulation of one or more embodiments.

Figure 3:
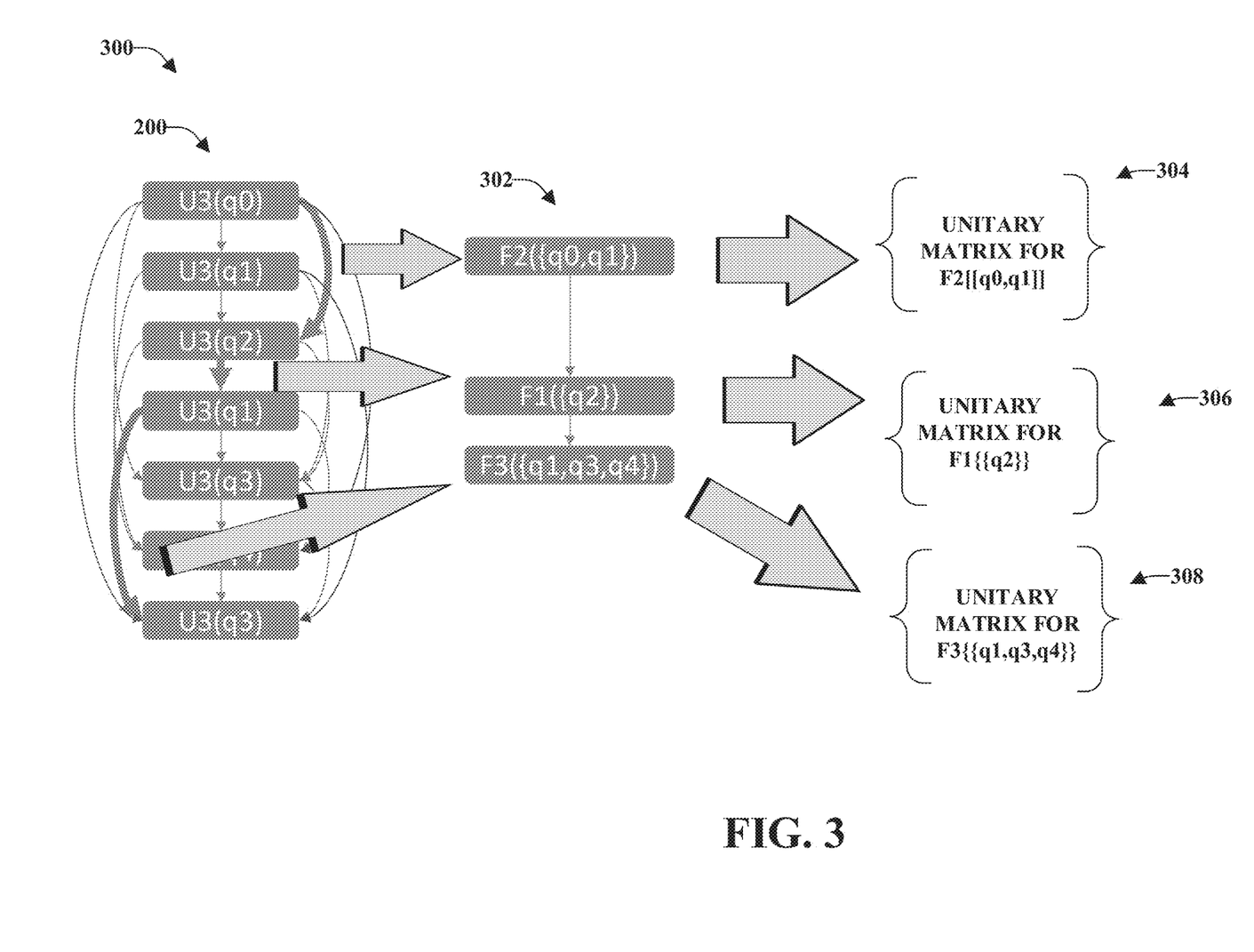
FIG. 3 illustrates a non-limiting, example embodiment to illustrate the generation of a unitary matrix for each gate fusion along the selected path illustrated in FIG. 2 in accordance with one or more embodiments described herein.

FIG. 3 illustrates a non-limiting, example embodiment to illustrate the generation of a unitary matrix for each gate fusion along the selected path illustrated in FIG. 2 in accordance with one or more embodiments described herein. As shown, path 200 comprises path 302 that represent a sequence of gate fusions, i.e., 2-qubit fusion F2{{q0, q1}}, 1-qubit fusion F1{{q2}}, and 3-qubit fusion F3{{q1, q3, q4}}. In one or more embodiments, unitary matrices 304, 306, and 308 are generated for each gate fusion along the path 200. For example, a gate (or gate fusion) for a n-qubit gate can be represented by a $2^n$ by $2^n$ unitary matrix. An advantage of this approach is that a simulator can calculate the product of these unitary matrices with greater operational intensity and improved memory locality.

Figure 4:
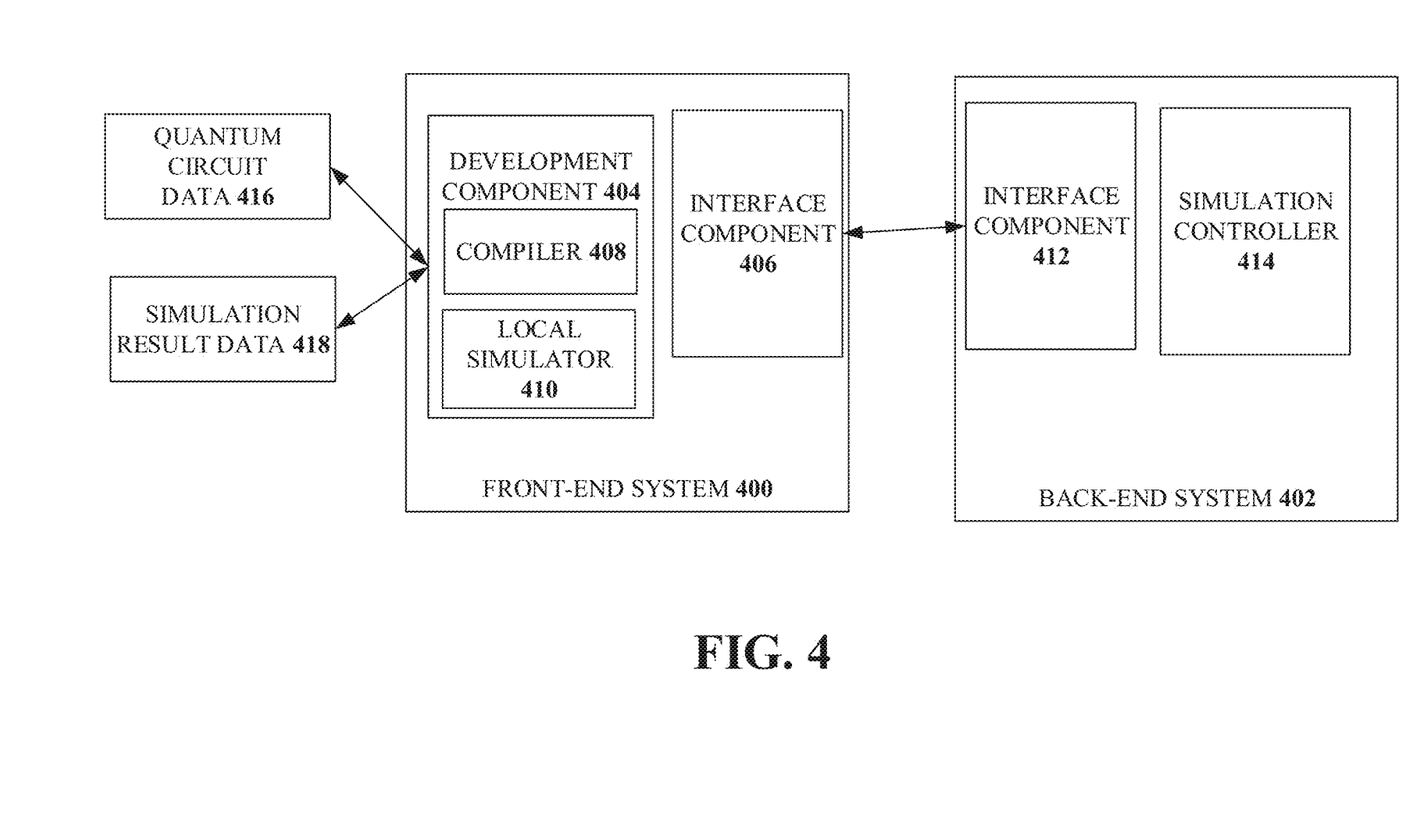
FIG. 4 illustrates a non-limiting, example flow diagram a block diagram of a system that facilitates quantum computing simulation in accordance with one or more embodiments described herein.

FIG. 4 illustrates a non-limiting, example flow diagram a block diagram of a system that facilitates quantum computing simulation in accordance with one or more embodiments described herein. As shown, the embodiments can be implemented based on a front-end system 400 and a back-end system 402. Systems 400 and 402 will now be further described.

Repetitive description of like elements employed in other embodiments described herein is omitted for sake of brevity. For example, the systems 400 and 402 can comprise a processor, a memory, network interface, and/or a storage. The memory can store computer executable components and instructions.

Aspects of systems (e.g., systems 400, 402, and the like), apparatuses, or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. For example, FIG. 7 describes a non-limiting, example computing environment 700 that can be implemented in systems 400 and 402.

In various embodiments, the systems 400 and 402 can be any type of component, machine, device, facility, apparatus, and/or instrument that comprises a processor and/or can be capable of effective and/or operative communication with a wired and/or wireless network. Components, machines, apparatuses, devices, facilities, and/or instrumentalities that can comprise the front-end system 400 can include tablet computing devices, handheld devices, server class computing machines and/or databases, laptop computers, notebook computers, desktop computers, cell phones, smart phones, consumer appliances and/or instrumentation, industrial and/or commercial devices, hand-held devices, digital assistants, multimedia Internet enabled phones, multimedia players, and the like.

Components, machines, apparatuses, devices, facilities, and/or instrumentalities that can comprise the back-end system 402 can include, server class computing machines and/or databases, laptop computers, notebook computers, desktop computers, and the like. The system 402 and/or components of the system 402 can be employed to solve new problems that arise through advancements in technologies mentioned above, computer architecture, and/or the like. One or more embodiments of the system 402 can provide technical improvements to quantum computing systems, quantum circuit systems, quantum processor systems, artificial intelligence systems, and/or other systems. One or more embodiments of the system 402 can also provide technical improvements to a quantum processor (e.g., a superconducting quantum processor) by improving processing performance of the quantum processor, improving processing efficiency of the quantum processor, improving processing characteristics of the quantum processor, improving timing characteristics of the quantum processor, and/or improving power efficiency of the quantum processor.

Accordingly, systems 400 and 402 can employ hardware and/or software to solve problems that are highly technical in nature, that are not abstract and that cannot be performed as a set of mental acts by a human. Further, in certain embodiments, some of the processes performed can be performed by one or more specialized computers (e.g., one or more specialized processing units, a specialized computer with a quantum computing component, etc.) to carry out defined tasks related to machine learning.

In the embodiment shown, the front-end system 400 can comprise a development component 404 and an interface component 406. These components will now be further described.

Development component 404 provides a development platform that allows a user to create/input quantum circuits, compile the quantum circuits into a representation that can be simulated, such as a QASM file, and simulate the quantum circuit. In some embodiments, the development component 404 is a software development kit that can be installed on front-end system 400. Development component 404 can comprise various application programming interfaces (APIs) and libraries that interface a programming language, such as Python or C++. In addition, the development component 404 can comprise various tools to assist in creating and editing quantum circuit data, such as quantum circuit data 416, and compile the quantum circuit data 416 into a quantum circuit representation, such as a QASM file. The development component 404 can also comprise various tools to analyze and format simulation result data 418 into graphical, textual, or another desired format.

As shown, the development component 404 can comprise a compiler 408. Compiler 408 can be a compiler or trans-compiler that transforms and converts quantum circuit data 416 into an appropriate representation, such as a QASM file. In some embodiments, compiler 408 can provide allow the quantum circuit data 416 to be simulated based on different hardware configurations, quantum scope and breadth, etc. In one embodiment, the compiler 408 can receive as input the quantum circuit data 416, unroll quantum circuit data 416 by expanding the data structures and definitions, perform various swaps to optimize the quantum circuit, and perform one or more gate cancellations.

In one embodiment, the compiler 408 can generate a graph of the quantum circuit (e.g., based on the quantum circuit data 416) and add edges corresponding to each n-qubit fusion possible in the quantum circuit, such as those illustrated in FIGS. 1-3. In addition, compiler 408 can determine various paths, i.e., a sequence of gate fusions between a source and destination quantum gate in the quantum circuit and select on or more of these paths for a simulation. The compiler 408 can select a path of any length through the graph. For example, any partial path through the graph can be employed in one or more embodiments.

For example, compiler 408 can assign or estimate costs for each edge based on a test run, the quantity of instructions that result from the gate fusion, an estimate, etc. The costs for each edge can represent any suitable parameter for an edge that connects a gate fusion to the next gate in the quantum circuit. In one embodiment, a cost represents an elapsed to execute a gate fusion. In one embodiment, the costs can be retrieved from a table stored in memory (such as memory 716 shown in FIG. 7) or provided from another device, such as back-end system 402 (via interface components 406 and 412). In an alternative embodiment, the costs can be determined based on a test run performed by the compiler 408 using instructions to simulate the gate fusion or based on an estimate of the elapsed time for a gate fusion. In one embodiment, compiler 408 can then select one or more paths based on the costs (or other criteria), for example, using a dynamic programming algorithm. In an alternative embodiment, the compiler 408 can selected one or more paths based on a Dijkstra algorithm to find a lowest cost path in the graph.

Alternatively, compiler 408 can request (via interface components 406 and 412) an analysis by back-end system 402 to determine one or more optimal paths through the graph 100. For example, simulation controller 414 in back-end system 402 can perform its own analysis based on the available memory, processing resources, etc. to determine an optimal path 200 and simulate a given quantum circuit. An advantage of this approach is that it offloads the processing needed to compile and analyze the various fusion scenarios, especially for large qubit quantum circuits.

Local simulator 410 can be simulator that is executed locally on front-end system 400. Local simulator 410 can provide a local simulation environment to develop and deploy simulation experiments on front-end system 400.

Interface component 406 provides an interface for front-end system 400 to communicate with other components running on system 400, such as compiler 408 and local simulator 410, as well as other computing devices, such as back-end system 402. In one embodiment, interface component 406 is software that provides various routines, protocols, and tools for front-end system 400.

In the embodiment shown, the back-end system 402 provides a remote additional resource to perform quantum computing simulations. For example, back-end system 402 can be accessible via a network and provide an array of simulators and quantum computing hardware. A plurality of front-end systems 400 can interface with back-end system 402, for example, to submit simulation requests. As shown, back-end system 402 can comprise an interface component 412 and a simulation controller 414.

Interface component 412 is a corresponding API to interface component 406 running on front-end system 400. In some embodiments, interface component 412 can assign unique tokens to each simulation request received from front-end system 400.

Simulation controller 414 schedules, executes, and outputs the results of the simulation requests, for example, received from front-end system 400. The simulation controller 414 provide simulation result data 418 via interface component 412. Simulation controller 414 can provide simulation result data 418 in various forms, such as graphical data, text/numerical data, stream data, etc.

Figure 5:
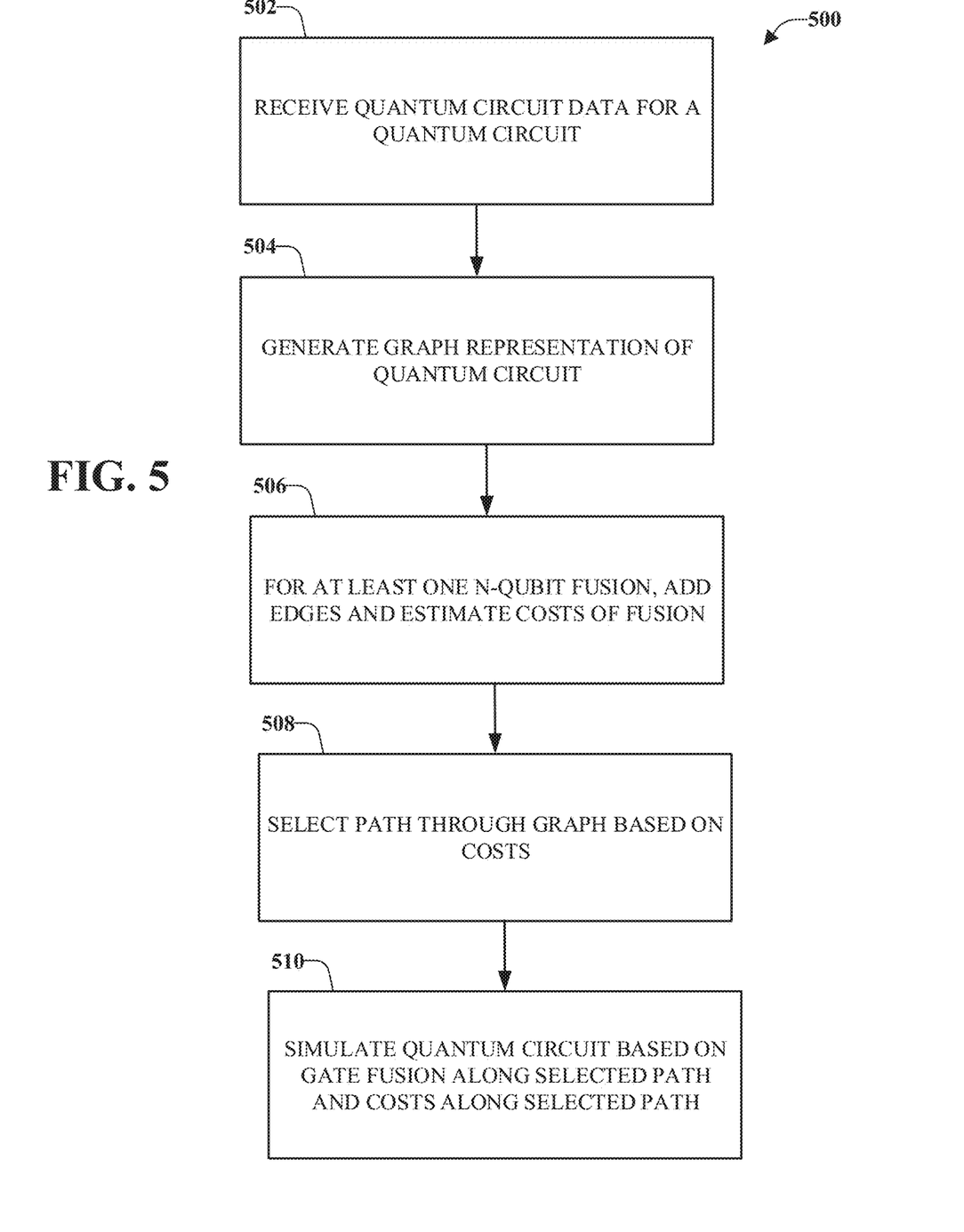
FIG. 5 illustrates a non-limiting, example flow diagram for simulating a quantum circuit in accordance with one or more embodiments described herein.

FIG. 5 illustrates a non-limiting, example flow diagram for simulating a quantum circuit in accordance with one or more embodiments described herein. Repetitive description of like elements employed in other embodiments described herein is omitted for sake of brevity. As will be further described, a method 500 can illustrate a process for simulating a quantum circuit locally on a computing device.

At 502, quantum circuit data 416 is received, for example, by front-end system 400 (via development component 404) for a quantum circuit. A user at front-end system 400 can use development component 404 to receive quantum circuit data 416 for a quantum circuit. The quantum circuit data 416 can be provided from a quantum algorithm, a text editor, such as QASM editor, or other form of data input. In response, development component 404 and compiler 408 can then generate a representation of the quantum circuit, such as in the form of a QASM file or other data format.

Figure 7:
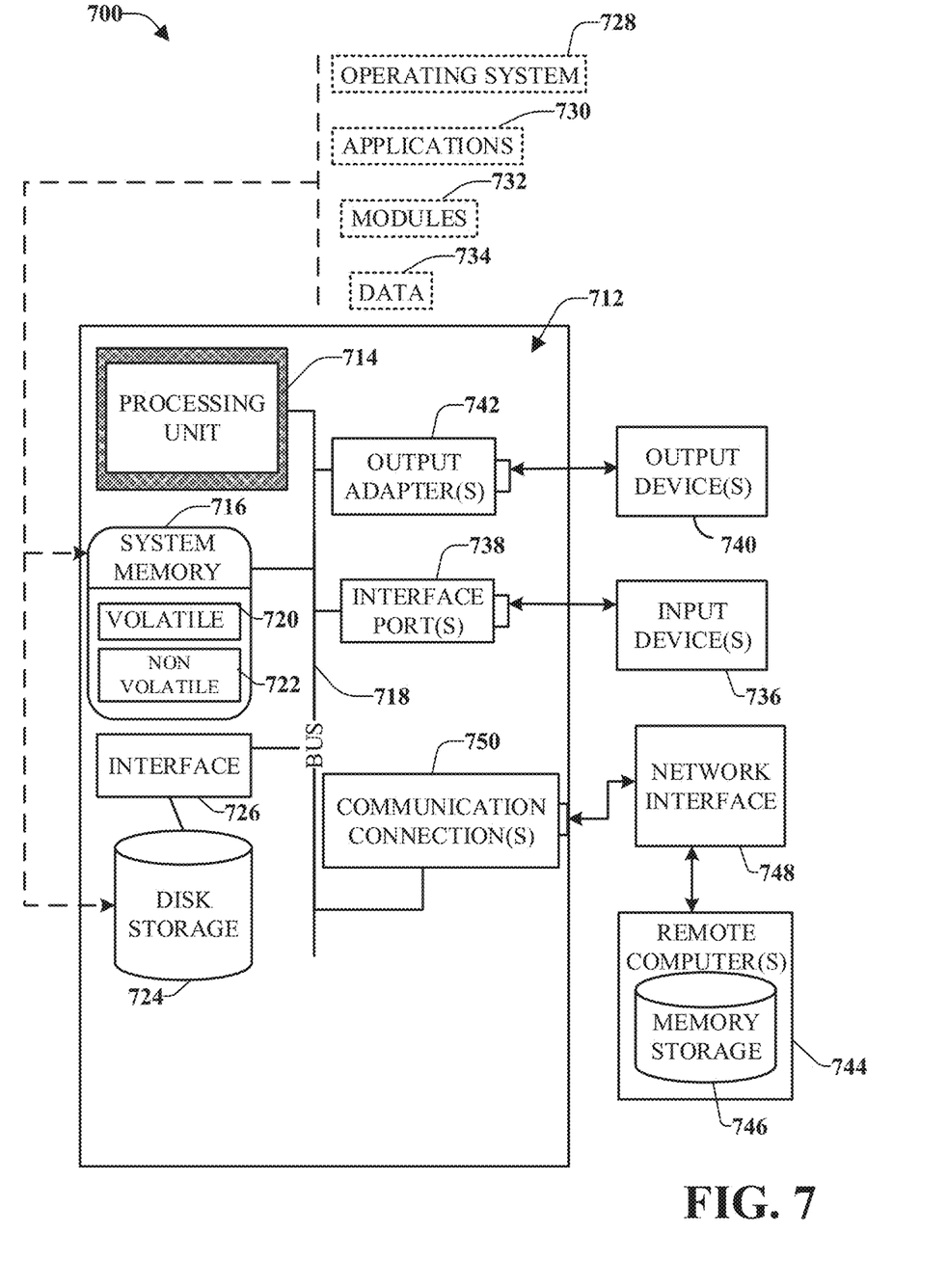
FIG. 7 illustrates a non-limiting, example block diagram of an operating environment in which one or more embodiments described herein can be facilitated.

At 504, a graph (such as graph 100) is generated (e.g., by compiler 408) from the quantum circuit data 416. In one embodiment, the compiler 408 can store the graph 100 in memory 716 (as shown in FIG. 7).

At 506, edges are added to the graph 100 (e.g., by compiler 408). In one embodiment, compiler 408 can add edges for each n-qubit fusion possible between a gate fusion (comprising two or more gates that are fused) and the next gate in the quantum circuit. Alternatively, compiler 408 can add edges for selected n-qubit fusions, such fusions for 5 or less qubits, 10 or less qubits, etc. The extent by which compiler 408 adds edges can be based on a variety of parameters, such as a user input, system resources, etc. For example, the compiler 408 can scope the number of qubits in a fusion based on the resources available to front-end system 400. A gate fusion for n-qubits can be represented by a $2^n$ by $2^n$ unitary matrix, and thus, the higher number of qubits subjected to a gate fusion, the larger the unitary matrix. In one embodiment, compiler 408 considers the memory allocation available (e.g., in memory 716) can impose or select an upper bound for the number of edges and n-qubit fusions that are considered.

In addition, compiler 408 can assign or estimate a cost (or any other parameter), for each edge. In one embodiment, for a given fusion, the compiler 408 can estimate a cost, retrieve a cost value from a stored table (such a table stored in memory 716), determine or estimate the quantity of instructions that result from the gate fusion, and/or perform a test run of the fusion. Any type of cost for a fusion can be utilized in the embodiments. In one embodiment, the compiler 408 uses cost to represent the elapsed time to execute a gate or a gate fusion.

At 508, a path is determined (e.g., by compiler 408). For example, in one embodiment, compiler 408 can utilize a Dijkstra algorithm to select a lowest cost path for a simulation. Compiler 408 can use any type of algorithm to select one or more paths.

Alternatively, compiler 408 can request (via interface components 406 and 412) an analysis by back-end system 402 to determine one or more optimal paths through the graph 100. For example, simulation controller 414 in back-end system 402 can perform its own analysis based on the available memory, processing resources, etc. to determine an optimal path 200 and simulate a given quantum circuit. An advantage of this approach is that it offloads the processing needed to compile and analyze the various fusion scenarios, especially for large qubit quantum circuits.

At 510, the quantum circuit is simulated (e.g., by local simulator 410). For example, development component 404 can submit a simulation request to interface component 406 with an address locator corresponding to local simulator 410. Alternatively, development component 404 can use interface component 406 and submit a simulation request to back-end system 402.

Figure 6:
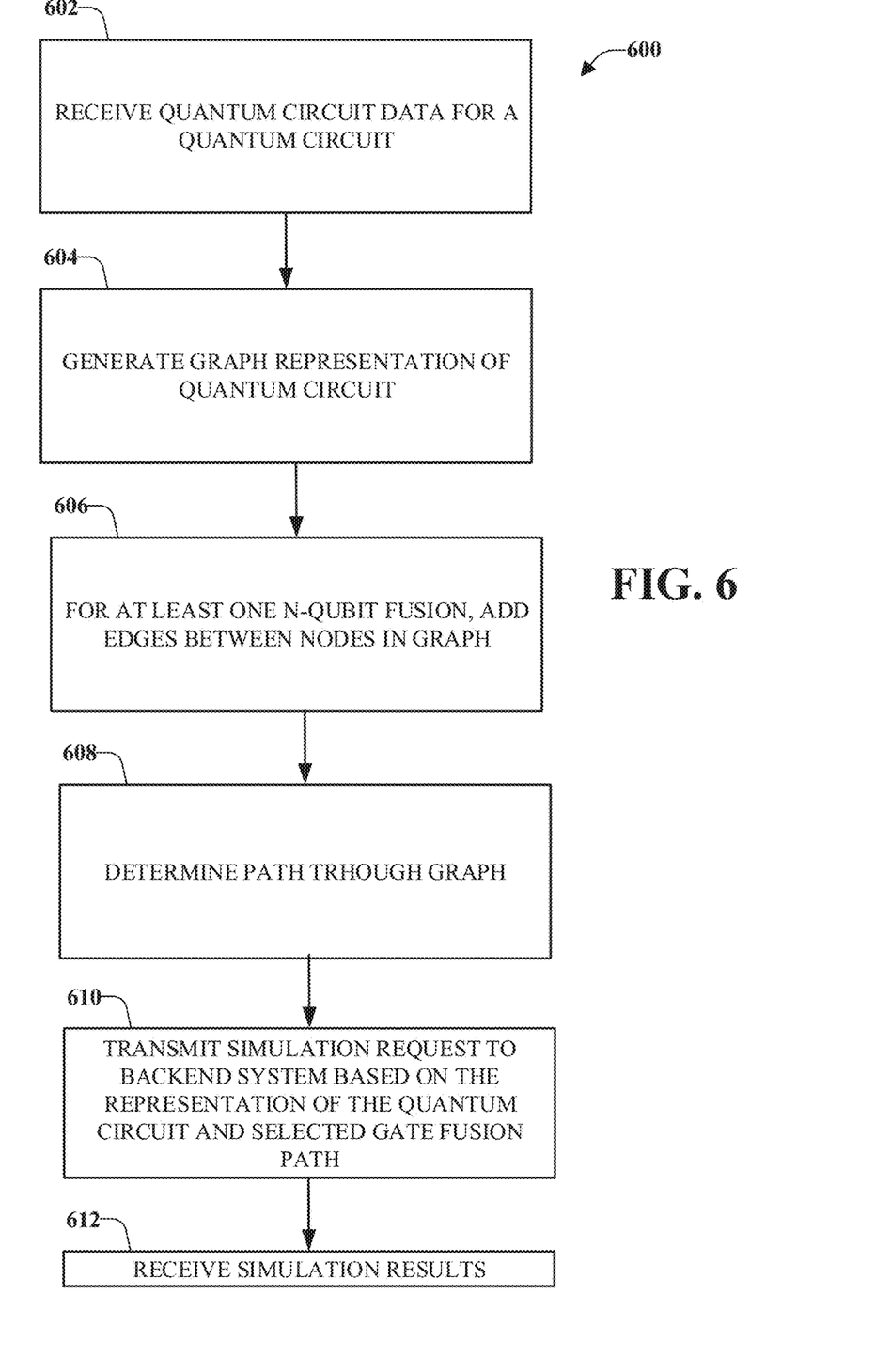
FIG. 6 illustrates another non-limiting, example flow diagram for simulating a quantum circuit in accordance with one or more embodiments described herein.

FIG. 6 illustrates another non-limiting, example flow diagram for simulating a quantum circuit in accordance with one or more embodiments described herein. Repetitive description of like elements employed in other embodiments described herein is omitted for sake of brevity. As will be further described, method 600 can illustrate a process for submitting a simulation request to remote device, such as back-end system 402.

At 602, quantum circuit data 416 is received (e.g., by development component 404) for a quantum circuit. For example, a user at front-end system 400 can use development component 404 to receive quantum circuit data 416 for a quantum circuit. The quantum circuit data 416 can be provided from a quantum algorithm, a text editor, such as QASM editor, or other form of data input. In response, development component 404 and compiler 408 can then generate a representation of the quantum circuit, such as in the form of a QASM file or other data format.

At 604, a graph (such as graph 100) is generated (e.g., by compiler 408) from the quantum circuit data 416. In one embodiment, the compiler 408 can store the graph 100 in memory 716 (as shown in FIG. 7).

At 606, edges are added to the graph 100 (e.g., by compiler 408). In one embodiment, compiler 408 can add edges for each n-qubit fusion possible. Alternatively, compiler 408 can add edges for selected n-qubit fusions, such fusions for 5 or less qubits, 10 or less qubits, etc. The extent by which compiler 408 adds edges can be based on a variety of parameters, such as a user input, system resources, etc. The extent by which compiler 408 adds edges can be based on a variety of parameters, such as a user input, system resources, etc. For example, the compiler 408 can scope the number of qubits in a fusion based on the resources available to front-end system 400. As previously noted, the higher number of qubits subjected to a gate fusion, the larger the unitary matrix. In one embodiment, compiler 408 considers the memory allocation available (e.g., in memory 716) can impose or select an upper bound for the number of edges and n-qubit fusions that are considered.

In addition, compiler 408 can assign or estimate a parameter, such as a cost, for each edge. In one embodiment, for a given fusion, the compiler 408 can estimate a cost, retrieve a cost value from a stored table (such a table stored in memory 716), determine or estimate the quantity of instructions that result from the gate fusion, and/or perform a test run of the fusion. Any type of cost for a fusion can be utilized in the embodiments.

Alternatively, compiler 408 can request (via interface components 406 and 412) an analysis by back-end system 402 to the costs. For example, simulation controller 414 in back-end system 402 can perform its own analysis based on the available memory, processing resources, etc. to respective costs in simulators used by back-end system 402. An advantage of this approach is that it offloads the processing needed to compile and analyze the various fusion scenarios, especially for large qubit quantum circuits, and adapt the simulation to the location of simulator and its processing environment (for example, where simulation controller 414 is used to perform the simulation).

At 608, a path is determined (e.g., by compiler 408). For example, in one embodiment, compiler 408 can utilize a Dijkstra algorithm to select a lowest cost path for a simulation. Compiler 408 can use any type of algorithm to select one or more paths.

Alternatively, compiler 408 can request (via interface components 406 and 412) an analysis by back-end system 402 to select one or more optimal paths through the graph 100. For example, simulation controller 414 in back-end system 402 can perform its own analysis based on the available memory, processing resources, etc. to determine an optimal path 200 and simulate a given quantum circuit. In one or more embodiments, the back-end system 402 can use remote memory resources from one or more distributed computing devices (such as those shown in FIG. 7). The back-end system 402 can include the cost and/or load of using these remote memory resources when selecting one or more optimal paths through the graph 100. An advantage of this approach is that it offloads the processing needed to compile and analyze the various fusion scenarios, especially for large qubit quantum circuits.

At 610, the development component 404 can then create a simulation request based on quantum circuit data 416 and transmit (e.g., via the interface component 406) the simulation request to back-end system 402. For example, development component 404 can submit a simulation request to interface component 406 having an address locator corresponding to the location of back-end system 402 on a network. In response, interface component 406 can forward the simulation request to interface component 412 at back-end system 402. Simulation controller 414 can then schedule and run the simulation. In some embodiments, simulation controller 414 can provide a plurality of simulation platforms corresponding to quantum computing devices having different breadth of qubits, e.g., of 5 qubits or more. Simulation controller 414 will then generate simulation result data 418, for example, based on compiling and executing program code (e.g., QASM data) in the simulation request. The simulation result data can be in any suitable form, such as text, numerical data, graphical data, stream data, etc.

At 612, simulation results are received (e.g., by front-end system 400 via interface components 406 and 412). In one embodiment, a user can use one or more tools provided by development component 404 to output, analyze, and/or visualize the simulation result data 418.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

In order to provide a context for the various aspects of the disclosed subject matter, FIG. 7 as well as the following discussion are intended to provide a general description of a suitable environment in which the various aspects of the disclosed subject matter can be implemented.

FIG. 7 illustrates a block diagram of an example, non-limiting operating environment in which one or more embodiments described herein can be facilitated. Repetitive description of like elements employed in other embodiments described herein is omitted for sake of brevity. With reference to FIG. 7, a suitable operating environment 700 for implementing various aspects of this disclosure can also include a computer 712. The computer 712 can also include a processing unit 714, a system memory 717, and a system bus 718. The system bus 718 couples system components including, but not limited to, the system memory 716 to the processing unit 714. The processing unit 714 can be any of various available processors. Dual microprocessors and other multiprocessor architectures also can be employed as the processing unit 714. The system bus 718 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), Video Electronics Standards Association (VESA) Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI). The system memory 716 can also include volatile memory 720 and nonvolatile memory 722. The basic input/output system (BIOS), containing the basic routines to transfer information between elements within the computer 712, such as during start-up, is stored in nonvolatile memory 722. By way of illustration, and not limitation, nonvolatile memory 722 can include Read Only Memory (ROM), Programmable ROM (PROM), Electrically Programmable ROM (EPROM), Electrically Erasable Programmable ROM (EEPROM), flash memory, or nonvolatile Random Access Memory (RAM) (e.g., Ferroelectric RAM (FeRAM)). Volatile memory 720 can also include RAM, which acts as external cache memory. By way of illustration and not limitation, RAM is available in many forms such as Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), Direct Rambus RAM (DRRAM), direct Rambus dynamic RAM (DRDRAM), and Rambus dynamic RAM.

Computer 712 can also include removable/non-removable, volatile/non-volatile computer storage media. FIG. 7 illustrates, for example, a disk storage 724. Disk storage 724 can also include, but is not limited to, devices like a magnetic disk drive, floppy disk drive, tape drive, Jaz drive, Zip drive, LS-100 drive, flash memory card, or memory stick. The disk storage 724 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 724 to the system bus 718, a removable or non-removable interface is typically used, such as interface 726. FIG. 7 also depicts software that acts as an intermediary between users and the basic computer resources described in the suitable operating environment 700. Such software can also include, for example, an operating system 728. Operating system 728, which can be stored on disk storage 724, acts to control and allocate resources of the computer 712. System applications 730 take advantage of the management of resources by operating system 728 through program modules 732 and program data 734, e.g., stored either in system memory 716 or on disk storage 724. It is to be appreciated that this disclosure can be implemented with various operating systems or combinations of operating systems. A user enters commands or information into the computer 712 through input device(s) 736. Input devices 736 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 714 through the system bus 718 via interface port(s) 738. Interface port(s) 738 include, for example, a serial port, a parallel port, a game port, and a universal serial bus (USB). Output device(s) 740 use some of the same type of ports as input device(s) 736. Thus, for example, a USB port can be used to provide input to computer 712, and to output information from computer 712 to an output device 740. Output adapter 742 is provided to illustrate that there are some output devices 740 like monitors, speakers, and printers, among other output devices 740, which require special adapters. The output adapters 742 include, by way of illustration and not limitation, video and sound cards that provide a method of connection between the output device 740 and the system bus 718. It should be noted that other devices and/or systems of devices provide both input and output capabilities such as remote computer(s) 744.

Computer 712 can operate in a networked environment using logical connections to one or more remote computers, such as remote computer(s) 744. The remote computer(s) 744 can be a computer, a server, a router, a network PC, a workstation, a microprocessor based appliance, a peer device or other common network node and the like, and typically can also include many or all of the elements described relative to computer 712. For purposes of brevity, only a memory storage device 746 is illustrated with remote computer(s) 744. Remote computer(s) 744 is logically connected to computer 712 through a network interface 748 and then physically connected via communication connection 750. Network interface 748 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 750 refers to the hardware/software employed to connect the network interface 748 to the system bus 718. While communication connection 750 is shown for illustrative clarity inside computer 712, it can also be external to computer 712. The hardware/software for connection to the network interface 748 can also include, for exemplary purposes only, internal and external technologies such as, modems including regular telephone grade modems, cable modems and DSL modems, ISDN adapters, and Ethernet cards.

The present invention can be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create method for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can be implemented in combination with other program modules. Generally, program modules include routines, programs, components, data structures, etc. that perform tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. Yet another example, a component can be an apparatus that provides specific functionality through electronic components without mechanical parts, wherein the electronic components can include a processor or other method to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include ROM, PROM, EPROM, EEPROM, flash memory, or nonvolatile RAM (e.g., FeRAM. Volatile memory can include RAM, which can act as external cache memory, for example. Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory that stores computer executable components; and a processor that executes the computer executable components stored in the memory, wherein the computer executable components comprise:
  a development component that receives data for a quantum circuit comprising a plurality of quantum gates operating on one or more qubits, generates a graph that represents the quantum circuit, wherein the graph comprises nodes representative of the plurality of quantum gates and edges added between the nodes to indicate where gate fusions can be applied among the plurality of quantum gates, and select one or more paths through at least a portion of the graph based on lowest respective costs of the edges where the gate fusions can be applied, wherein cost is a value representing at least one of amount of memory space used to perform the gate fusion or elapsed time to execute the gate fusion, and wherein an upper bound for a number of edges is based on available memory space; and
  a simulator that simulates the quantum circuit based on the one or more paths selected by the development component.

2. The system of claim 1, wherein the development component comprises a compiler that determines the respective costs for one or more of the edges based on a quantity of instructions used to simulate where the gate fusions can be applied in the quantum circuit, wherein an upper bound for a number of qubits in a gate fusion is based on available memory space.

3. The system of claim 1, wherein the development component comprises a compiler that determines the respective costs for at least one of the edges based on a test run of where the gate fusions can be applied in the quantum circuit, wherein the test run comprises simulating the gate fusions.

4. The system of claim 1, wherein the development component comprises a compiler that determines the respective costs for at least one of the edges based on retrieving a value from a pre-computed table stored in the memory.

5. The system of claim 1, wherein the development component comprises a compiler that determines the respective costs based on determining a quantity of qubits on which the plurality of quantum gates being fused operates and estimating the costs based on the quantity of qubits.

6. The system of claim 1, wherein the development component further determines a lowest cost path through the graph based on the costs of the edges and a Dijkstra algorithm.

7. The system of claim 1, wherein the development component generates a $2^n$ by $2^n$ unitary matrix for at least one of the gate fusions along the selected one or more paths, wherein n is the number of qubits in the gate fusion.

8. A system, comprising:
a memory that stores computer executable components; and
a processor that executes the computer executable components stored in the memory, wherein the computer executable components comprise:
  an interface component that receives a simulation request comprising a representation of a quantum circuit, wherein the quantum circuit comprises a plurality of quantum gates operating on one or more qubits, generates a graph representative of the quantum circuit, wherein the graph comprises nodes that represent the plurality of quantum gates and edges added between the nodes to indicate where gate fusions can be applied among the plurality of quantum gates, wherein cost is a value representing at least one of amount of memory space used to perform the gate fusion or elapsed time to execute the gate fusion, and wherein an upper bound for a number of edges is based on available memory space; and
  a simulation component that selects one or more paths through at least a portion of the graph based on lowest respective costs of the edges where the gate fusions can be applied in the quantum circuit, simulates the quantum circuit based on the simulation request and the selected one or more paths, and transmits a result.

9. The system of claim 8, wherein the simulation component determines the respective costs for at least one of the edges based on a quantity of instructions used to simulate where the gate fusions can be applied in the quantum circuit.

10. The system of claim 8, wherein the simulation component determines the respective costs for at least one of the edges based on a test run of where the gate fusions can be applied in the quantum circuit, wherein the test run comprises simulating the gate fusions.

11. The system of claim 8, wherein the simulation component determines the respective costs for at least one of the edges based on retrieving a value from a pre-computed table stored in the memory.

12. The system of claim 8, wherein the simulation component further determines a lowest cost path through the graph based on the costs of the edges and a Dijkstra algorithm.

13. The system of claim 8, wherein the simulation component further generates a $2^n$ by $2^n$ unitary matrix for at least one of the gate fusions along the selected one or more paths, wherein n is the number of qubits in the gate fusion.

14. A computer-implemented method, comprising:
receiving data for a quantum circuit comprising a plurality of quantum gates operating on one or more qubits;
generating a graph that represents the quantum circuit, wherein the graph comprises nodes representative of the plurality of quantum gates and edges added between the nodes to indicate where gate fusions can be applied among the plurality of quantum gates, and wherein the edges are assigned respective costs for application of the gate fusions, wherein cost is a value representing at least one of amount of memory space used to perform the gate fusion or elapsed time to execute the gate fusion, and wherein an upper bound for a number of edges is based on available memory space; and
simulating the quantum circuit based on one or more selected paths through at least a portion of the graph and the respective costs along the one or more selected paths, wherein the one or more selected paths are selected based on lowest respective cost.

15. The computer-implemented method of claim 14, wherein the generating the graph comprises determining respective costs for at least one of the edges based on a quantity of instructions used to simulate where the gate fusions can be applied in the quantum circuit.

16. The computer-implemented method of claim 14, wherein the generating the graph comprises determining the respective costs for at least one of the edges based on a test run of where the gate fusions can be applied in the quantum circuit, wherein the test run comprises simulating the gate fusions.

17. The computer-implemented method of claim 14, wherein generating the graph comprises determining the respective costs for at least one of the edges based on retrieving a value from a stored pre-computed table.

18. The computer-implemented method of claim 14, wherein the generating the graph comprises determining the respective costs based on determining a quantity of qubits on which the plurality of quantum gates being fused operates and estimating the costs based on the quantity of qubits.

19. The computer-implemented method of claim 14, wherein the simulating the quantum circuit further comprises determining a lowest cost path through the graph based on the costs of the edges and a Dijkstra algorithm as one of the one or more selected paths.

20. A computer program product that facilitates quantum computing simulation of quantum circuit, the computer program product comprising a computer readable storage medium having program instructions embodied therewith, the program instructions are executable by a processor to cause the processor to:
  receive, by a processor, data for a quantum circuit comprising a plurality of quantum gates operating on one or more qubits;
  generate, by the processor, a graph that represents the quantum circuit, wherein the graph comprises nodes representative of the plurality of quantum gates and edges added between the nodes to indicate where gate fusions can be applied among the plurality of quantum gates, and wherein the edges are assigned respective costs for where the gate fusions can be applied, wherein cost is a value representing at least one of amount of memory space used to perform the gate fusion or elapsed time to execute the gate fusion, and wherein an upper bound for a number of edges is based on available memory space; and
  simulate, by the processor, the quantum circuit based on one or more selected paths and the respective costs along the one or more selected paths, wherein the one or more selected paths are selected based on lowest respective cost.

21. The computer program product of claim 20, wherein the program instructions are further executable by the processor to cause the processor to determine respective costs for at least one of the edges based on a quantity of instructions used to simulate where the gate fusions can be applied in the quantum circuit.

22. The computer program product of claim 20, wherein the program instructions are further executable by the processor to cause the processor to determine the respective costs for at least one of the edges based on a test run of where gate fusions can be applied in the quantum circuit, wherein the test run comprises simulating the gate fusions.

23. The computer program product of claim 20, wherein the program instructions are further executable by the processor to cause the processor to determine the respective costs for at least one of the edges based on retrieving a value from a stored pre-computed table stored.

24. The computer program product of claim 20, wherein the program instructions are further executable by the processor to cause the processor to determine the respective costs based on determining a quantity of qubits on which the plurality of quantum gates being fused operates and estimating the costs based on the quantity of qubits.

25. A computer program product that facilitates quantum computing simulation of quantum circuit, the computer program product comprising a computer readable storage medium having program instructions embodied therewith, the program instructions are executable by a processor to cause the processor to:
  generate, by the processor, a graph that represents a quantum circuit comprising a plurality of quantum gates operating on one or more qubits, wherein the graph comprises nodes representative of the plurality of quantum gates and edges added between the nodes to indicate where gate fusions can be applied among the plurality of quantum gates, and wherein the edges are assigned respective costs for where the gate fusions can be applied, wherein cost is a value representing at least one of amount of memory space used to perform the gate fusion or elapsed time to execute the gate fusion, and wherein an upper bound for a number of edges is based on available memory space; and
  simulate, by the processor, the quantum circuit based on one or more selected paths and the respective costs along the one or more selected paths, wherein the one or more selected paths are selected based on lowest respective cost.

* * * * *